(12) United States Patent
Atsumi et al.

(10) Patent No.: US 7,362,970 B2
(45) Date of Patent: Apr. 22, 2008

(54) ELECTRONIC DEVICE FOR COMPRESSING IMAGE DATA AND PRODUCING THUMBNAIL IMAGE, IMAGE PROCESSING APPARATUS, AND DATA STRUCTURE

(75) Inventors: Eiji Atsumi, Kamakura (JP); Janne Haavisto, Kevatniitynkuja (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/299,577

(22) Filed: Dec. 12, 2005

(65) Prior Publication Data

US 2006/0158682 A1 Jul. 20, 2006

Related U.S. Application Data

(63) Continuation of application No. PCT/JP03/07558, filed on Jun. 13, 2003.

(51) Int. Cl.
*G03B 29/00* (2006.01)
*H04N 5/228* (2006.01)

(52) U.S. Cl. .................... 396/429; 343/222.1

(58) Field of Classification Search ............... 396/287, 396/429; 348/231.99, 231.3, 222.01, 207.99, 348/333.01, 333.05
See application file for complete search history.

(56) References Cited

U.S. PATENT DOCUMENTS

| | | | |
|---|---|---|---|
| 6,266,349 B1 | 7/2001 | Fukui et al. | |
| 6,573,931 B1* | 6/2003 | Horii et al. | ............ 348/211.14 |
| 6,674,472 B1* | 1/2004 | Tsutsui | ................... 348/333.05 |
| 6,897,895 B1* | 5/2005 | Okada | ................... 348/231.99 |
| 7,046,281 B1* | 5/2006 | Kumagai et al. | ...... 348/231.99 |
| 7,139,020 B2* | 11/2006 | Tamashima | .............. 348/231.3 |
| 2005/0068421 A1* | 3/2005 | Dutta et al. | ............. 348/207.99 |
| 2006/0072027 A1* | 4/2006 | Shibayama | .............. 348/333.1 |
| 2006/0152600 A1* | 7/2006 | Hamada et al. | ........ 348/231.99 |
| 2006/0192860 A1* | 8/2006 | Atsumi et al. | ............ 348/222.1 |
| 2006/0244835 A1* | 11/2006 | Shin et al. | ............. 348/207.99 |

FOREIGN PATENT DOCUMENTS

| | | | |
|---|---|---|---|
| JP | 06-178125 A | | 6/1994 |
| JP | 10-136338 A | | 5/1998 |
| JP | 11-145940 A | | 5/1999 |
| JP | 2000-050198 A | | 2/2000 |
| JP | 2002-077803 A | | 3/2002 |
| JP | 2002-370405 A | | 12/2002 |
| WO | WO 00/04716 A | | 1/2000 |

* cited by examiner

*Primary Examiner*—W. B. Perkey
(74) *Attorney, Agent, or Firm*—Cohen Pontani Lieberman & Pavane LLP

(57) ABSTRACT

A camera module compresses image data and produces a thumbnail image of this image data in FIFO order (First In First Out) by several lines of the image so as to enable transmission of the image data to the host module while significantly decreasing the size of the frame buffer memory. This can be achieved by, for example, an electronic device, including: a camera module, which transmits the data acquired by photographing; and a host module, which receives the data; wherein the camera module alternately transmits a compressed small portion including the data made by compressing the small portion of the image data for one frame and a sub small portion including the data with the resolution of the small portion reduced.

14 Claims, 9 Drawing Sheets

ELECTRONIC DEVICE FOR COMPRESSING IMAGE DATA AND PRODUCING THUMBNAIL IMAGE, IMAGE PROCESSING APPARATUS, AND DATA STRUCTURE

RELATED APPLICATION

This application is a U.S. Continuation Application under 35 USC 371 of International Application PCT/JP2003/007558 filed 13 Jun. 2003.

BACKGROUND OF THE INVENTION

1. Field of the Invention

The present invention relates to a structure regarding compression of the image data and production of a thumbnail image in an electronic device provided with a photographing mechanism capable of taking a picture of a still image and a moving image, an image processing apparatus, and a data structure.

2. Description of the Related Art

In recent years, it's often the case that a camera is incorporated in an electronic device such as a personal computer, a PDA, and a cellular phone, so that such an electronic device can take a picture of a still image and a moving image. These electronic devices are configured by a camera module and other part (a host module). The camera module is provided with a solid-state image sensing device. Converting the light inputted in this solid-state image sensing device into an electric signal and applying the necessary image processing to this electric signal, the image data is produced. Then, the obtained image data is transmitted to the host module. The host module takes charge of a telephone functionality and a PDA functionality, saves the image data transmitted from the camera module in a recording medium, and then, displays this image data to a display unit such as an LCD. The structure and the signal processing used for taking a picture of the still image and the moving image refers to a structure and the signal processing of a device used exclusively by photographing such as a conventional digital camera and digital video camera. Such a conventional art is disclosed in JP-A-9-147095 and JP-A-10-155137 or the like.

FIG. 9 is a pattern diagram showing an example of the structure and the signal processing of the electronic device, in which a camera using the conventional art is incorporated. A camera cellular phone 201 of the conventional art is configured by a camera module 202 and a host module 203. The processing to be carried out in the camera module 202 is loosely described below. In step 205, a solid-state image sensing device such as a CCD converts a light into an electric signal, and further, it digitizes this electric signal. In step 206, the image data is constructed from the output data of the digitized solid-state image sensing device and the image data is outputted in step 207. In the same way, the processing to be carried out in the camera module 203 is loosely described below. At first, in step 209, receiving the image data outputted from the camera module, this image data is temporarily saved in a frame buffer memory. Next, in step 210, reading out the image data saved in the frame buffer memory, this image data is compressed in a format such as a JPEG and in step 211, reading out the image data saved in the frame buffer memory, the thumbnail data of this image data is produced. In the meantime, the thumbnail is an image produced remarkably decreasing a resolution of the original image data and it is mainly produced to be displayed on a small display screen of the cellular phone and the digital camera. The compression image data is saved in a data recording medium such as a flash memory and a memory card in step 212, the thumbnail data is displayed on the display unit such as a LCD in step 213, and further, the thumbnail may be saved in the data recording medium together with the compression image data.

However, if the electronic device such as the camera cellular phone and the camera PDA is produced by the art that has been developed depending on the device used exclusively by taking a picture, such as a digital camera and a digital video camera, distinctive problems occur. According to one of these problems, the data amount to be transmitted between the camera module and the host module should be kept within the bus width of a transmission path. If the resolution of the solid-state image sensing device of the camera module is increased, it seems preferable that the image data is compressed in advance in the camera module so as to keep the data amount to be transmitted between the camera module and the host module in the bus width of the transmission path. The data communication amount between the modules should be decreased not only in the case of the solid-state image sensing device having high resolution but also in the case of taking a picture of the moving image.

Moreover, in the electronic device having the camera incorporated therein, considering the load of the processing apparatus of the host module, it is believed that the thumbnail is also produced in the camera module. This is particularly needed in taking a picture of the moving image because the image data about 10 to 30 frames per second are continuously transmitted from the camera module to the host module upon taking a picture of the moving image and the load of the host module is made larger if the compression, production of the thumbnail, saving into the recording medium, and display of the thumbnail about these all image data are performed in the host module. Further, it is so because the electronic device having the camera incorporated therein should spare its processing ability not only to the functionality regarding these photographing but also to the functionalities peculiar to the host module such as a telephone function and a schedule function.

For the reasons mentioned above, it seems preferable that the compression of the image data and the production of the thumbnail image of this image data are carried out in the camera module in the electronic device having the camera incorporated therein. However, assuming that the thumbnail production functionality is simply moved from the host module to the camera module to be incorporated therein, it is necessary for the camera module to have a large frame buffer memory in order to temporarily save the entire of the image data of one frame. This frame buffer memory causes rising of the cost and the size of the camera module and more this problem becomes serious, particularly the more the resolution of the image data is increased.

SUMMARY OF THE INVENTION

The present invention relates to an art, whereby the camera module compresses the image data and produces the thumbnail image of this image data in the order FIFO (First In First Out) by several lines of the image so as to enable transmission of the image data to the host module while decreasing the size of the frame buffer memory.

A first aspect of the present invention may provide an electronic device, including: a camera module, which transmits the data acquired by photographing; and a host module, which receives the data; wherein the camera module alternately transmits a compressed small portion including the data made by compressing the small portion of the image data for one frame and a sub small portion including the data with the resolution of the small portion reduced.

Further, in order to solve the above-mentioned problem, a second aspect of the present invention may provide an image processing apparatus, wherein the image processing apparatus holds the small portion of the image data for one frame; produces a compressed small portion including the data made by compressing the small portion and a sub small portion including the data with the resolution of the small portion reduced; and carries out the processing of sequentially transmitting the compressed small portion and the sub small portion with respect to a plurality of small portions of the frame. If this image processing apparatus processes the all small portions constructing one frame sequentially, it is possible to perform the compression of the image data and the production of the thumbnail of the entirety of this frame. Further, the image processing apparatus according to the second aspect carries out compression and production of a thumbnail image with respect to each small portion of image data which constitute one frame so that the buffer memory for storing the image data of the entirety of one frame at once is not required. Depending on such a characteristic, it becomes possible to largely decrease the size and the price of the image processing apparatus according to the second aspect of the present invention.

According to this image processing apparatus, the compressed small portion may include the entirety of the data made by compressing the small portion or may only include a part thereof. For example, when the size of the data in which a certain portion is compressed is long, at first, only this portion of the compressed data is transmitted and other portions may be transmitted together with the data in which a next portion is compressed. In addition, in the image processing apparatus, the data length of the compressed small portion may be a variable length to meet with requirements of various type of interfaces. In the meantime, a method to decrease the resolution of a small portion of the image data may include a method to select only one pixel from among a plurality of pixel data to desert other pixels and a method to represent the plurality of pixel data by the data of one pixel according to the calculation such as averaging or the like. In addition, according to the embodiments, any of the compressed small portion and the sub small portion may be transmitted before or behind.

In the meantime, here, the frame means one completed image and simply, the frame means one piece of the still image and one frame configuring the moving image. Accordingly, in the second aspect of the present invention, not only the still image but also the moving image can be processed and in the case of the moving image processing, the advantage of the present invention is found to the maximum. Further, assuming that the resolution of the image of one frame is, for example, 1600×1200, the image data of an RGB format configuring one frame is made in such a manner that 1200 lines constructed by 1600 pieces of data in a lateral direction are arranged in a longitudinal direction with respect to each color of R(red), G(green), and B(blue). Obviously the format of the image is not the RGB format but it is other format such as a well-known YUV format. In addition, the size of the small portion of this frame is varied depending on the embodiments, however, for example, it is conceivable that the size thereof is made eight lines or sixteen lines or thirty-two lines of the image data of one frame or the like.

Moreover, according to the second aspect of the present invention, the sub small portion and the compressed small portion can be produced so that they can be separated each other. According to an embodiment, a start code and an end code are inserted in the sub small portion. Further, this image processing apparatus can be provided with a coding unit, which detects a specific bit pattern from a data row of the data to be transmitted and protects the specific bit pattern.

In this way, in order to produce the compression data and the thumbnail data of the image data for one frame, the image processing apparatus according to the second aspect of the present invention may use a method to perform the compression processing and the resolution decrease processing for each small portion of the image data of this frame and repeat the processing to sequentially transmit the produced compression small portion and sub small portion till all of the small portions constructing this frame are processed, so that it is not necessary to provide a large frame buffer for storing the image data of the entirety of one frame and the thumbnail data of the entire frame. The image processing apparatus according to the second aspect of the present invention can be made small with the cost kept reduced by just that much.

Moreover, in the image processing apparatus according to the second aspect of the present invention, it is preferable that the compression format is any one of a JPEG format JPEG 2000 format, or a Motion JPEG format but other compression method is not excluded. However, in the case of compressing the data in the JPEG format or a Motion JPEG format, two stages, namely, inverse cosine conversion and Huffman coding may appear in the compression process. In this case, the image processing apparatus according to the second aspect of the present invention can be constituted so that the sub small portion is produced from a result of the inverse cosine conversion of the small portion. This structure has an advantage such that the processing amount can be reduced by standardizing a portion of the processing decreasing the resolution of the small portion with the JPEG processing. In addition, the initialization of the compression processing is carried out every time the small portion is compressed. Typically, the initialization of the compression processing is carried out by initialization of the Huffman coding processing. The data size of the data made by compressing the small portion is varied depending on the content of the small portion to be compressed and the data length of the compressed data is generated by bits. However, the output of the compressed data is not carried out except for eight bits, namely, by bits. Therefore, there may be a case that a portion of the data made by compressing the small portion is not immediately transmitted and it is incorporated in the compressed small portion that is produced in the next processing to be transmitted. Then, initializing the compression processing every time each small portion is compressed and adding the necessary number of 0 to the last part of the data that does not satisfy a byte unit, the compression data corresponding to the corresponding small portion is outputted by bytes in just proportion. Upon initialization of the compression processing, by terminating a data row by a specific byte row that is determined in a JPEG standard referred to as Restart Interval Marker (RST) indicating that the compression processing is initialized, timing for initializing the Huffman decoding processing upon decoding can be transmitted to the decoding processing. According to this configuration, before the small block is processed and the next small block is processed, the all of the data of which each small portion is compressed can be immediately transmitted.

The image processing apparatus according to the second aspect of the present invention may provide a data processing apparatus, including the image processing apparatus or a camera apparatus, including the image processing apparatus. As an example of the camera device, the camera cellular phone, the camera module for the PDA, the digital camera, and a monitoring camera or the like can be considered. The data processing apparatus is constructed to incorporate the image processing apparatus according to the second aspect of the present invention, into for example, the LSA having various functionalities.

As an embodiment of this, particularly, the invention according to the third aspect of the present invention may provide an image processing apparatus, including: an image data producing unit, which fetches the RAW data produced by A/D converting the data outputted from a solid-state image sensing device and produces the image data for one frame from the RAW data; and a data processing unit, which holds the small portion of the image data, produces a compressed small portion including the data made by compressing the small portion and a sub small portion including the data with the resolution of the small portion reduced, and performs processing of sequentially transmitting the compressed small portion and the sub small portion with respect to a plurality of small portions of the image data. The RAW data is the digital data saving the format outputted from the solid-state image sensing device yet and the data that has not been completed as the image as it is. As an example of the RAW data, there is the data in a Bayer format, in which units of two green data, one red data, and one blue data are repeated. The image data producing unit according to the third aspect of the present invention may construct the image data that is completed as the image from this RAW data and this processing can be carried out by a well known method such as a CFA interpolation. In addition, the RGB format or the YUV format is popular for the format of the image data. The image data processing apparatus according to the third aspect of the present invention is the optimum as the processing apparatus of the camera module for the cellular phone and the PDA.

Moreover, in order to solve the above-described problems, a fourth aspect of the present invention may provide an image processing apparatus, which processes the received data; wherein the data includes the compression image data produced by compressing the image data for one frame and the thumbnail data with the resolution of the image data of one frame; and further, the data has a data structure that the small portion of the compression image data and the small portion of the thumbnail data may appear alternately; and the image processing apparatus receives the data; extracts the small portion of a plurality of the compression image data from among the received data to produce the compression image data of the entirety of the one frame; and further, extracts the small portion of a plurality of the thumbnail data from among the received data to produce the thumbnail data of the entirety of the one frame. This image processing apparatus can have a decoding unit, which detects a bit pattern protected by a specific bit pattern from among a data row of the received data to unprotect the protection of the specific bit pattern. In addition, the image processing apparatus according to the fourth aspect of the present invention may comprise a data processing apparatus, including this image processing apparatus. Such a data processing apparatus is useful as a processing apparatus for a host module of the electronic device that is configured by the camera module and the host module. In addition, the image processing apparatus according to the fourth aspect of the present invention may comprise an electronic device, including this image processing apparatus.

Further, in order to solve the above-described problems, a fifth aspect of the present invention may provide an electronic device, including: a camera module, which transmits the data acquired by photographing; and a host module, which is provided with a main storage device and a display unit, receives the data, and saves the data in the main storage device; wherein the camera module comprises a unit of producing the image data for one frame, and further, the camera module produces a compressed small portion including the data made by compressing the small portion of the image data and a sub small portion including the data with the resolution of the small portion reduced, and the processing of sequentially transmitting the compressed small portion and the sub small portion is carried out with respect to a plurality of small portions of the image data; and the host module receives the sub small portion and the compressed small portion, produces the thumbnail data with the resolution of the image data for one frame reduced from among the received plural sub small portions, displays the thumbnail data on a display unit, produces the compression image data made by compressing the image data for one frame from among the received plural compressed small portions, and saves the compression image data in a main storage device.

Still further, in order to solve the above-described problems, a sixth aspect of the present invention may provide a data structure of the data including the compression image data of the image data for one frame and the thumbnail data with the resolution of the image data of one frame; and the data structure has a structure such that a small portion of the compression image data and a small portion of the thumbnail data may appear alternately.

Further, a seventh aspect of the present invention may provide an electronic device, including: a camera module, which transmits the data acquired by photographing; and a host module, which is provided with a main storage device and a display unit, receives the data, and saves the data in a main storage device; herein, in the case that the data to be transmitted includes a bit pattern corresponding to, for example, a head portion of a command code in an interface part to connect the camera module to the host module, the camera module inserts a protection identifier after the bit pattern and the host module deletes the protection identifier continued after the bit pattern.

DETAILED DESCRIPTION OF THE INVENTION

Hereinafter, the present invention will be described with reference to FIGS. 1 to 8 by employing the embodiments of the present invention.

Figure 1:
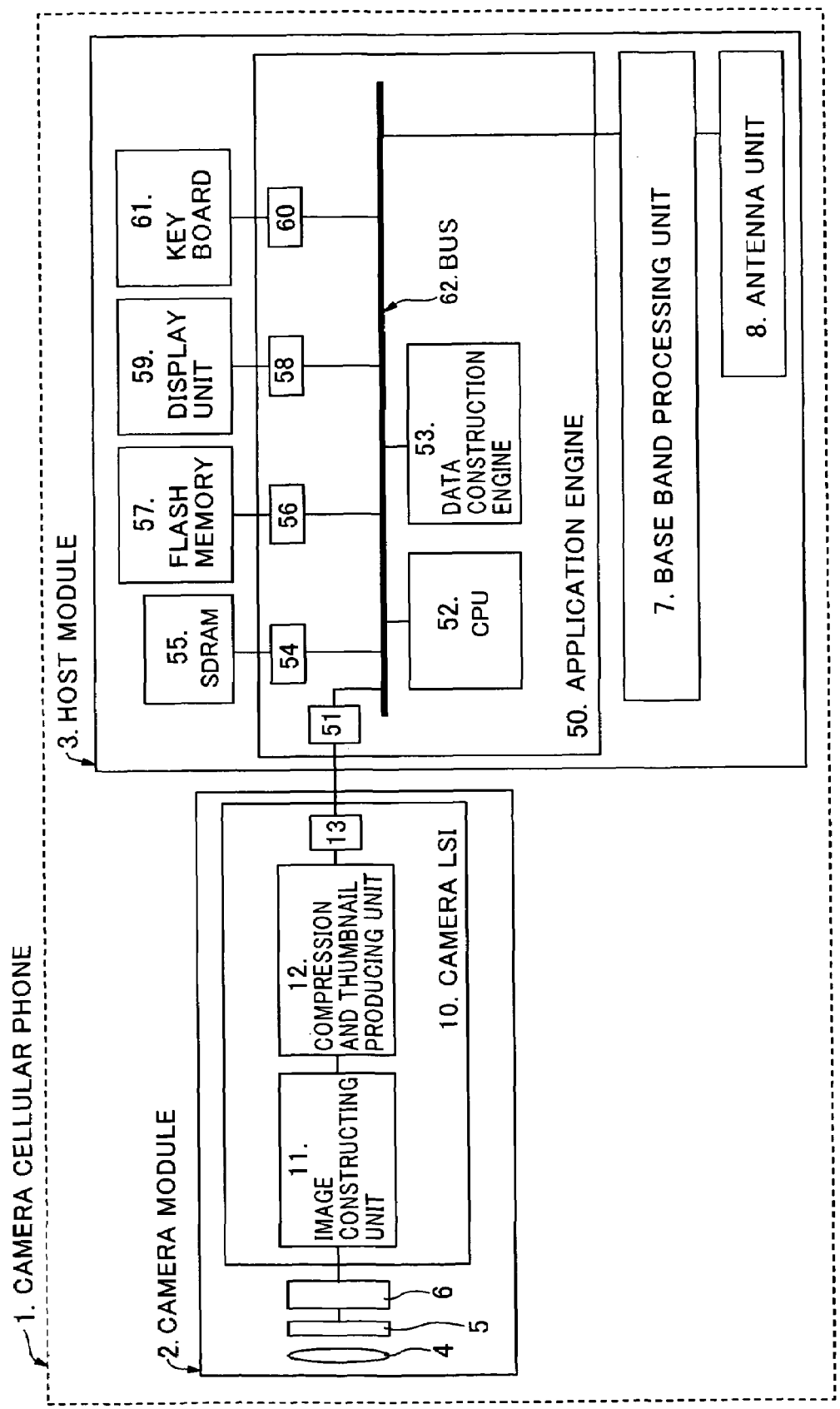
FIG. 1 illustrates an example such that an electronic device according to the present invention is applied to a camera cellular phone.

FIG. 1 illustrates an example such that an electronic device according to the present invention is applied to a camera cellular phone. A camera cellular phone 1 according to the present invention is configured by a camera module 2 and a host module 2. The camera module 2 is provided with a lens 4, a solid-state image sensing device 5, an A/D converter 6, and a camera LSI 110, and the camera LSI 10 is provided with an image constructing unit 11 and a compression and thumbnail producing unit 12. The host module 3 is provided with a base band processing unit 7 and an antenna unit 8 for processing the telephone function and further, the host module 3 is provided with an application engine 50. The application engine 50 is mounted so as to process the function other than the telephone functionality and controls the functionalities such as the image processing, control of a user interface, a game, a schedule, and a memo or the like, and the application engine 50 is provided with a CPU 52 and a data construction engine 53. The CPU 52 is connected to a SPRAM 55, a flash memory (a main storage unit) 57, a display unit 59, and a key board 61 or the like through a bus 62, Interfaces 54, 56, 58, and 60, respectively.

Upon photographing, the light that passed the lens 4 of the camera module 2 is converted into an electric signal by the solid-state image sensing device 5 and this electric signal is digitized by the A/D converter 6. This data that is only digitized is called as the RAW data and this has the data structure just as the output of the solid-state image sensing device is such as a Bayer format or the like and this data is not made the image data capable of being displayed by the display unit or the like. The RAW data is constructed into the image data capable of being displayed by the display unit or the like in an image constructing unit 11 for the first time. The constructed image data is compressed by the compression and thumbnail producing unit 12 and is transmitted from the host interface 13. Further, the compression and thumbnail producing unit 12 may produce a thumbnail and in the same way, the thumbnail is transmitted from the host interface 13. The data to be transmitted has a structure that the portion only compressing the small portion of the image data and the portion reducing the resolution of this small portion, namely, a portion of the thumbnail data may appear alternately (to be described later again).

The data transmitted from the camera module 2 is received by the host module 3 through a camera interface 51. The host module 3 may construct the compression image data and the thumbnail data of the entirety of one frame from the data in which the compression part and the thumbnail part are arranged alternately again. Then, the host module 3 may save the compression image data in the flash memory 57 and the thumbnail data is displayed by the display unit 59.

Figure 2:
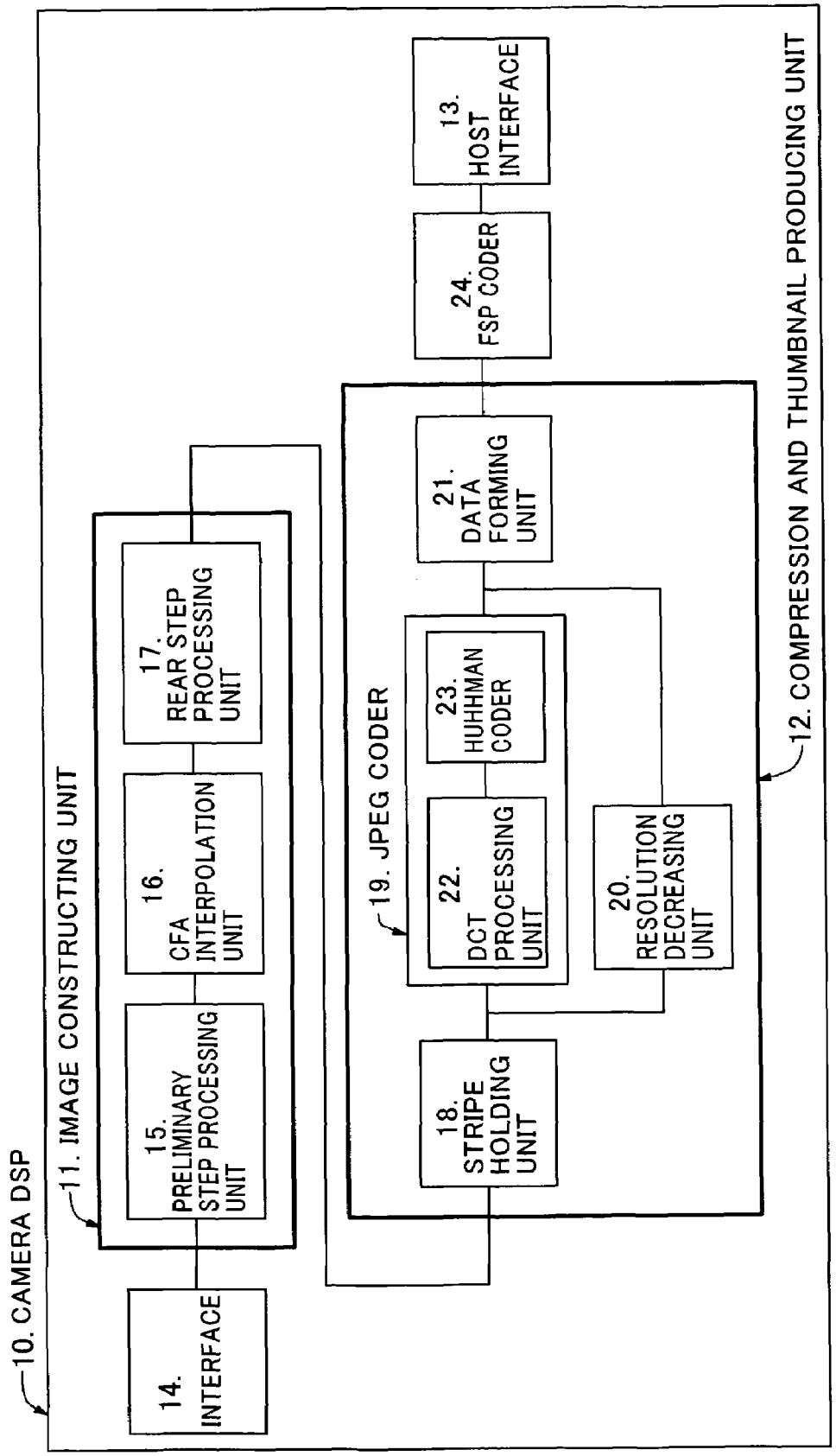
FIG. 2 illustrates an example such that an image processing apparatus according to the present invention is applied to a LSI for a camera.

With reference to FIG. 2, the camera LSI 10 according to the present invention to be mounted in the camera module of the camera cellular phone according to the present invention will be described in detail below. As described above, the camera LSI 10 is provided with the image constructing unit 11 and the compression and thumbnail producing unit 12, and the image pickup device 11 is further provided with a preliminary step processing unit 15, a CFA interpolation unit 16, and a rear step processing unit 17; and the compression and thumbnail producing unit 12 is further provided with a stripe saving unit 18, a JPEG coder 19 including a DCT processing unit 22 and a Huhhman coder 23, a resolution decreasing unit 20, and a data forming unit 21. In addition to these units, the camera LSI 10 is provided with a solid-state image sensing device—camera LSI interface 14, a FSP coder 24, and the host interface 13.

When the photographing is carried out, the light passed through the lens 4 is converted into an electronic signal by the solid-state image sensing device 5; the electronic signal is digitized and converted into the RAW data by the A/D converter 6; and the RAW data is supplied to the camera LSI 10. The RAW data is supplied to the image constructing unit 11 through the solid-state image sensing device—camera LSI interface 14, and then, the image constructing unit 11 may perform the following processing. At first, the preliminary step processing unit 15 may carry out the original picture processing such as correction of shading of a lens and white balance or the like with respect to the RAW data. Next, the CFA interpolation unit 16 may extract the components of red (R), green (G), and blue (B) from the RAW data to which the original picture processing is applied and provide a certain interpolation so as to produce image data of an RGB format composed of an RGB three planes. Finally, the rear step processing unit 17 may carry out the processing such as enhancement of outline and gamma correction or the like with respect to the produced image data. Here, the domain conversion may be carried out from the RGB format into the YUV format. Thus, the image data is sequentially produced once every one line or once every several lines. The produced image data is sequentially outputted to the image pickup device 11 by the produced amount. In the case of taking a picture of the still image, the above-described processing is continued till the entirety of one frame is processed, and in the case of the moving image, the above-described processing is continuously repeated for many frames constructing the moving image.

Then, the image data produced by the image constructing unit 11 is processed by the compression and thumbnail producing unit 12. The compression and thumbnail producing unit 12 does not process the entire image data of one frame at once but it processes the image data configured every several lines every time the image data are produced by the set number of lines. The image data produced by the set number of line is called as a stripe hereinafter. At first, a stripe holding unit 18 may temporarily save this image data in a buffer memory of the stripe saving unit 18 every time it is configured, for example, by eight lines. Next, the JPEG coder 19 may read out the stripe saved in the stripe holding unit 18 to compress the stripe due to the JPEG format. As well known, other than the JPEG format, also in the Motion JPEG format to be used for the moving image, the compression mainly requires the processing of two stages called as the inverse cosine conversion and the Huffman coding. These processing are carried out by the DCT processing unit 22 and the Huhhman coder 23, respectively.

The Huhhman coder 23 may initialize itself after performing a sequence of processing to the stripe from the DCT processing till the Huhhman coding. In the initialization processing of the Huhhman coding 23, several bits that do not satisfy the byte unit with respect to the compression data is compensated by a vale 0 to be made into a byte unit, so that the compression data produced by the stripe can be outputted in terms of byte. Further, the compression data is terminated in a byte pattern called as a Restart Interval Market (RST) indicating that this compression data is initialized for every initialization small blocks. The data length of the compression data terminated by the RST is changed depending on the image content of the corresponding small portion to be made into the data of the variable length. In addition, the RST is a byte pattern indicating reset of the Huhhman coding included in the JPEG standard, so that change is not forced to the signal processing of JPEG decoding.

In parallel with the compression operation by the JPEG coder 19, the resolution decreasing unit 20 may read out the stripe saved in the stripe holding unit 18 and may produce the thumbnail data with its resolution reduced. A method to decrease the resolution may include a method to select only one pixel from among a plurality of pixel data and a method to produce the new data of one sample from the data of several samples by calculation such as averaging or the like. According to the embodiment shown in FIG. 2, the resolution decreasing unit 20 reads out the data saved in the stripe saving unit 18, however, according to the other embodiment, as a result of the inverse cosine conversion may be read from the outlet of the DCT processing unit of the JPEG coder 19. According to the simplest method, reading out the power of the lowest frequency component from among the frequency components acquired by inverse-cosine converting the corresponding stripe, this power may be made into the thumbnail data of this stripe.

The compression data of the stripe made by the JPEG coder 19 and the thumbnail data of the stripe made by the resolution decreasing unit 20 are transmitted to the data forming unit 21. The data forming unit 21 may add an indicator for producing a boundary with the compression data of the stripe to the thumbnail of the stripe. This indicator is used to separate the thumbnail data of the stripe from the compression data of the stripe in the host module. A reference numeral 34 of FIG. 4 denotes this and the structure of the data will be described later. In addition, when the processed stripe is the first part of the frame including this stripe or the last part thereof, the indicator indicating this is added. This is denoted by 31 and 38 in FIG. 4 and also, this will be described later. Other than this, it is also possible to add a header necessary for the data of the JPEG format and the photographing data such as a shutter speed and an aperture diaphragm or the like.

The data outputted from the compression and thumbnail producing unit 12 is transmitted to the host module through the host interface 13. However, depending on the kind of interface to be mounted between the camera LSI and the host, a certain bit pattern may be defined as, for example, a particular command code indicating beginning and ending of the frame. For example, it is conceivable that a pattern that 0X00 is continued twice is defined as the command to ignore the subsequent data at the receiving side of the interface. Therefore, the FSP coder 24 determines if the bit pattern corresponding to such a particular bit pattern exists or not every time the data outputted from the compression and thumbnail producing unit 12 is transmitted to the host module, and if this exists, the coding processing to protect this bit pattern is applied. For example, when a pattern such as 0X00, 0X00 is detected, this pattern is prevented from being miscomprehended as the command code at the host side by inserting 0XA5 that is a protection identifier between 0X00 and 0X00 and transmitting it.

Figure 3:
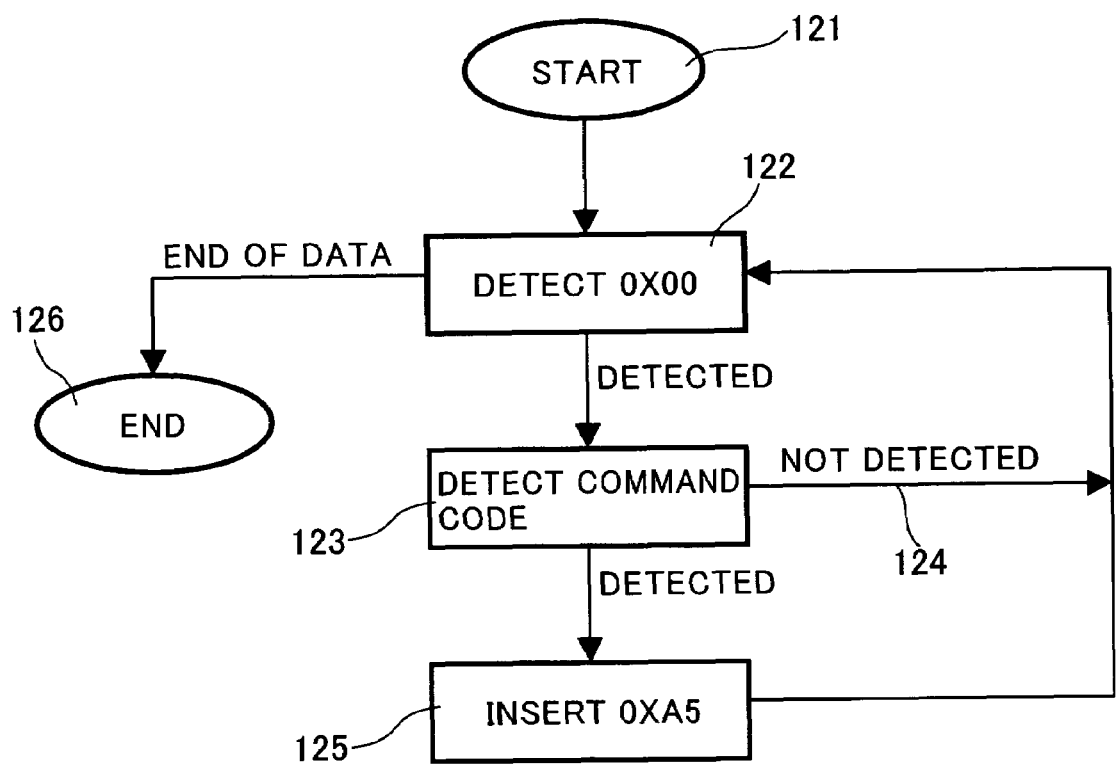
FIG. 3 is a flow chart showing the FSP coding processing that is carried out by the image processing apparatus according to the present invention.

With reference to FIG. 3, the flow of the FSP coding processing will be described below with reference to the flow chart. Here, the explanation is given assuming that the command code appears at the receiving side of the interface in the case that the transmitted bit pattern of 0X00, 0XEE, and XFF appear subsequently to 0X00. At first, in step 121, the data outputted from the compression and thumbnail producing unit 12 is sequentially inputted in the FSP coder (24 in FIG. 2). The data inputted here may be a bit-by-bit data or a byte-by-byte data. Next, in step 122, when the data inputted bit-by-bit or byte-by-byte approaches two bytes, the FSP coder 24 temporarily saves this and searches the existence of the bit pattern of 0X00 within the temporarily saved two bytes. If 0X00 is detected, proceeding to step 123, it is checked if the bit pattern subsequent to 0X00 corresponds to 0X00, 0XEE, 0XFF defined as the command code or not. When it is not the command code, transmitting out from the saved two bytes the bit number of the byte number corresponding to a unit of reading the data in the order of the FIFO as the output of the FSP coding processing, returning to the step 122, a new bit or a new byte corresponding to the reading unit and retrieving of the bit pattern of 0X00 is continued (step 124). When the command code is detected, in step 125, inserting 0XA5 after 0X00, only transmitting the byte newly added to the data reading unit and inserted in the order of THE FIFO, and in the step 121, reading a new bit or a new byte, the processing of the step 122 is repeated. When the data is completely inputted in the FSP coder 24, the FSP coding processing is terminated (step 126).

The above-described processing by the compression and thumbnail producing unit 12 and the FSP coder 24 is repeatedly carried out till the processing of the data of the entirety of one frame is terminated. In the case of taking a picture of the moving image, if the processing of the frame is terminated, the next frame processing is started.

As can be understood from the above-described embodiments, the camera LSI according to the present invention has no need to provide a frame buffer memory for temporarily keeping the image data of the entirety of one frame and a thumbnail buffer memory for temporarily keeping the entire thumbnail data of the entirety of one frame. The camera LSI only needs a buffer memory for temporarily keeping a stripe that is a small portion of the entirety of one frame and a buffer memory for saving the thumbnail data of this stripe. For example, as the size of the buffer for the thumbnail data of the stripe, the data capacity for one line of the thumbnail data is satisfactory. In the meantime, the size of the typical thumbnail image is QQVGA (160 pixels×120 lines). Therefore, according to the present invention, in the case of performing the processing by eight lines as buffering, assuming that one frame is 1,600 pixels×1,200 lines, it is possible to provide a camera module that performs both of the compression of the image and production of the thumbnail only by providing a buffer memory having the size $(^{160}/_{1,600}) \times (^{8}/_{1,200}) = (^{1}/_{15,000})$ of the frame buffer memory housing the image data for one frame or a buffer memory having the size $(^{1}/_{1}) \times (^{8}/_{120}) = (^{1}/_{15})$ of the thumbnail buffer memory housing the thumbnail data for one frame.

Next, with reference to FIG. 4, the structure of the data that is transmitted from the camera module 2 of the present invention and received by the host module 3 of the invention in the camera cellular phone 1 of the invention will be described below. At first, a frame start code 31 indicating start of a new frame is transmitted. Next, a thumbnail part start code 32 is transmitted, and subsequently, the thumbnail data 33 produced from the first stripe, a thumbnail part end code 34, the JPEG compression data 35 of this stripe, and an end code 36 of the JPEG compression data are transmitted. The data 41 from the code 32 till the code 36 may include the compression data and the thumbnail data that are produced from one stripe. When the transmission of the data regarding one stripe is terminated, subsequently, the thumbnail start code 37 (this is the same as 32) is transmitted, and then, the compression data and the thumbnail data produced from a next stripe are transmitted. This will be continued till the JPEG compression data of the last stripe configuring this frame is transmitted. If the JPEG compression data end code of the last stripe is transmitted, a frame end code 38 is transmitted. Accordingly, the data 42 from the code 31 till the code 38 may include the compression data and the thumbnail data configuring one frame.

In the case of taking a picture of the moving image, continuously, a new frame 43 is transmitted. Therefore, a frame start code 39 (this is the same as 31) is newly transmitted and subsequently, the compression data and the thumbnail data are alternately transmitted for each stripe. It depends on a person who puts the invention into practice what code is used for the frame start code and the thumbnail part start code or the like, however, in this embodiment, a byte pattern showing resetting of the Huffman coding included in the JPEG standard called as the above-described RST is used as the end code 36 of the JPEG compression data.

Figure 4:
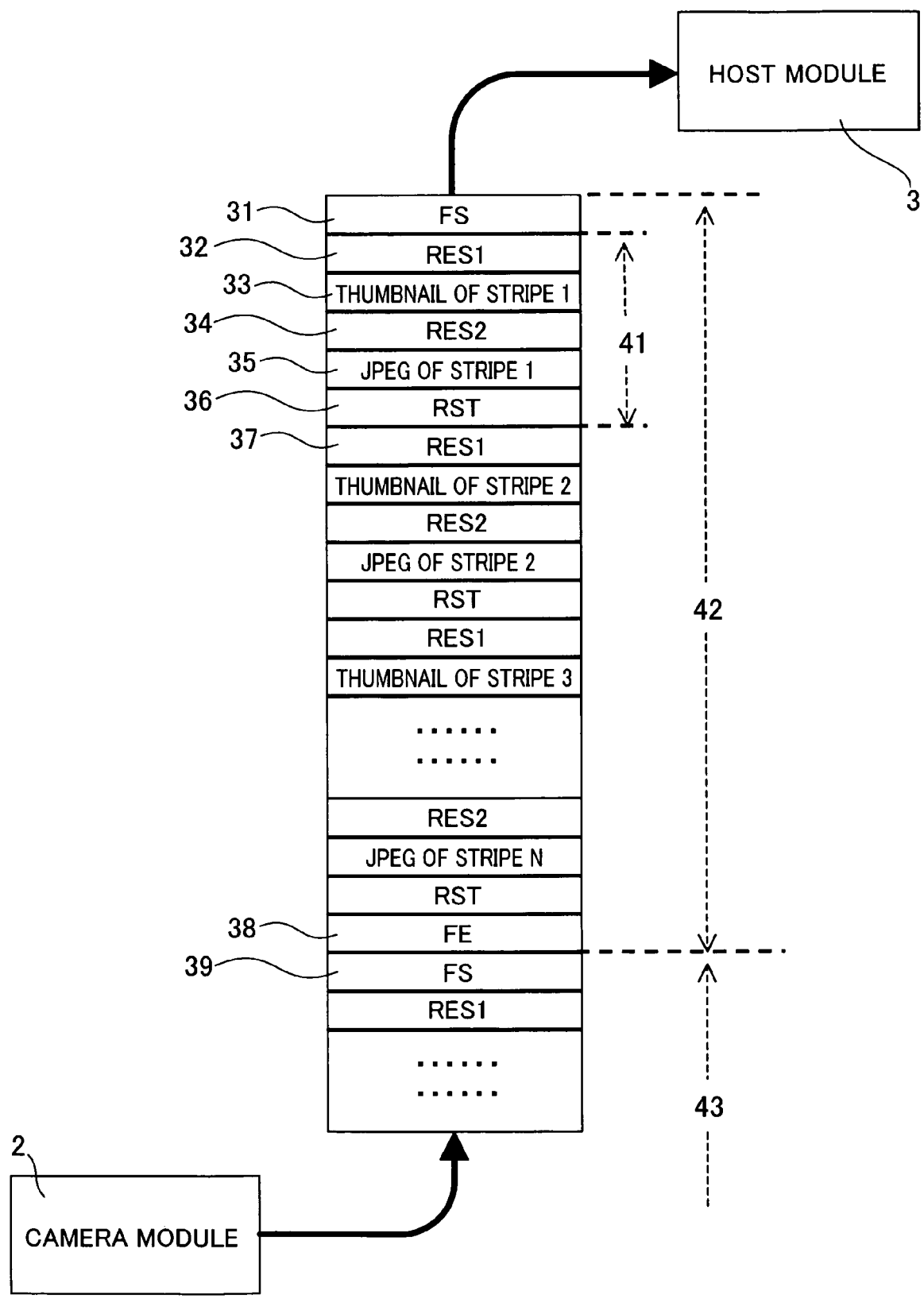
FIG. 4 illustrates an example of a structure of the data to be transmitted from the camera module to a host module in the electronic device according to the present invention.

In the meantime, not illustrated in FIG. 4, prior to the processing of the first frame of the still image and the moving image, the camera module 2 sometimes transmits the header information including the photographing information or the like. In this way, in the camera cellular phone 1 of the present invention, the data to be transmitted from the camera module 2 of the invention and received by the host module 3 of the invention has a structure such that the data made by compressing the small portion of one frame and the thumbnail data produced from this small portion repeatedly appear. This repetition structure appears because the camera module 2 of the present invention compresses the image data and produces the thumbnail without a large buffer memory.

Figure 5:
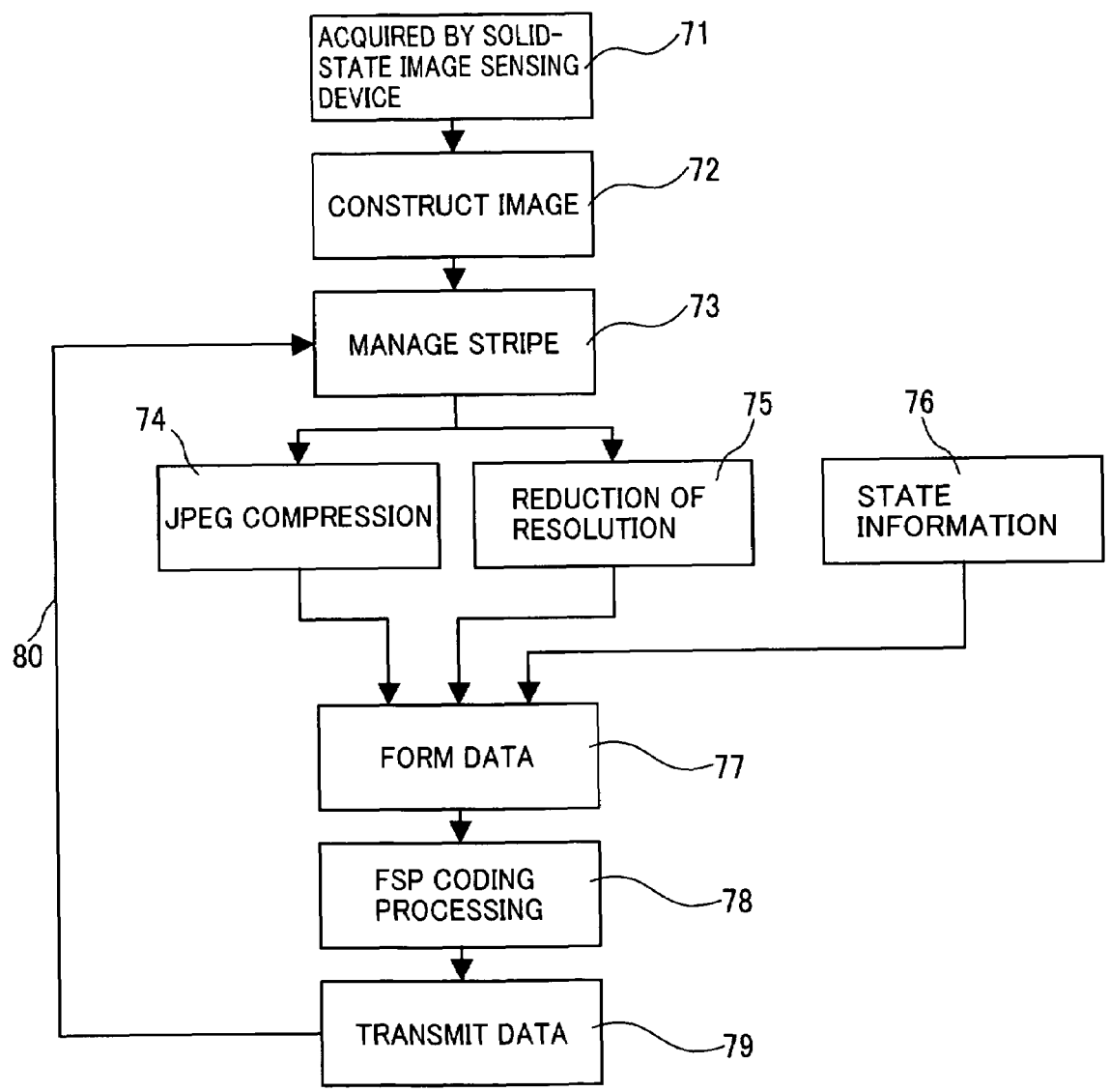
FIG. 5 is a flow chart showing the processing to be carried out by the camera module in the electronic device according to the present invention.

Next, with reference to FIG. 5, the processing carried out in the camera module 2 according to the present invention will be described by use of a flow chart. At first, in step 71, the data is acquired by the solid-state image sensing device 5. As described above, the RAW data in the format as it is outputted from the solid-state image sensing device is not the image data that can be displayed by the display unit yet. Therefore, in step 72, the image data in the RGB format or the YUV format that can be displayed by the display unit is constructed from the RAW data. This image data is constructed for every one line or several lines, however, in step 73, fetching the image data constructed in step 72 sequentially, these data are held by the stripe composed of the set number of lines. With respect to this stripe, the JPEG compression (step 74) and the thumbnail production (step 75) due to reduction of the resolution are carried out. In the step 74, after the JPEG compression, the initialization of the Huhhman coding is also carried out. In step 77, an indicator is added so that the compression data can be discriminated from the thumbnail data, and further, the frame start code and the frame end code may be added. It is possible to add the state information such as the exposition information (step 76). In step 78, the data for which processing of the step 77 is finished is checked and upon transmission of this, a bit pattern that is feared to be misunderstood as the command code at the host side is protected. In step 79, the camera module 2 transmits the processed data to the host module 3. Till the all parts of the image data configuring one frame have been completely processed, the processing from the step 73 to the step 79 are repeated (step 80). In the case of taking a picture of the moving image, till all of the photographed frames have been processed, the processing from the step 71 to step 80 are repeated.

As shown in FIG. 4, the data transmitted in this way has a structure that the data made of compressing the small portion of the image data configuring one frame and the thumbnail data produced from this small portion may appear alternately.

Figure 6:
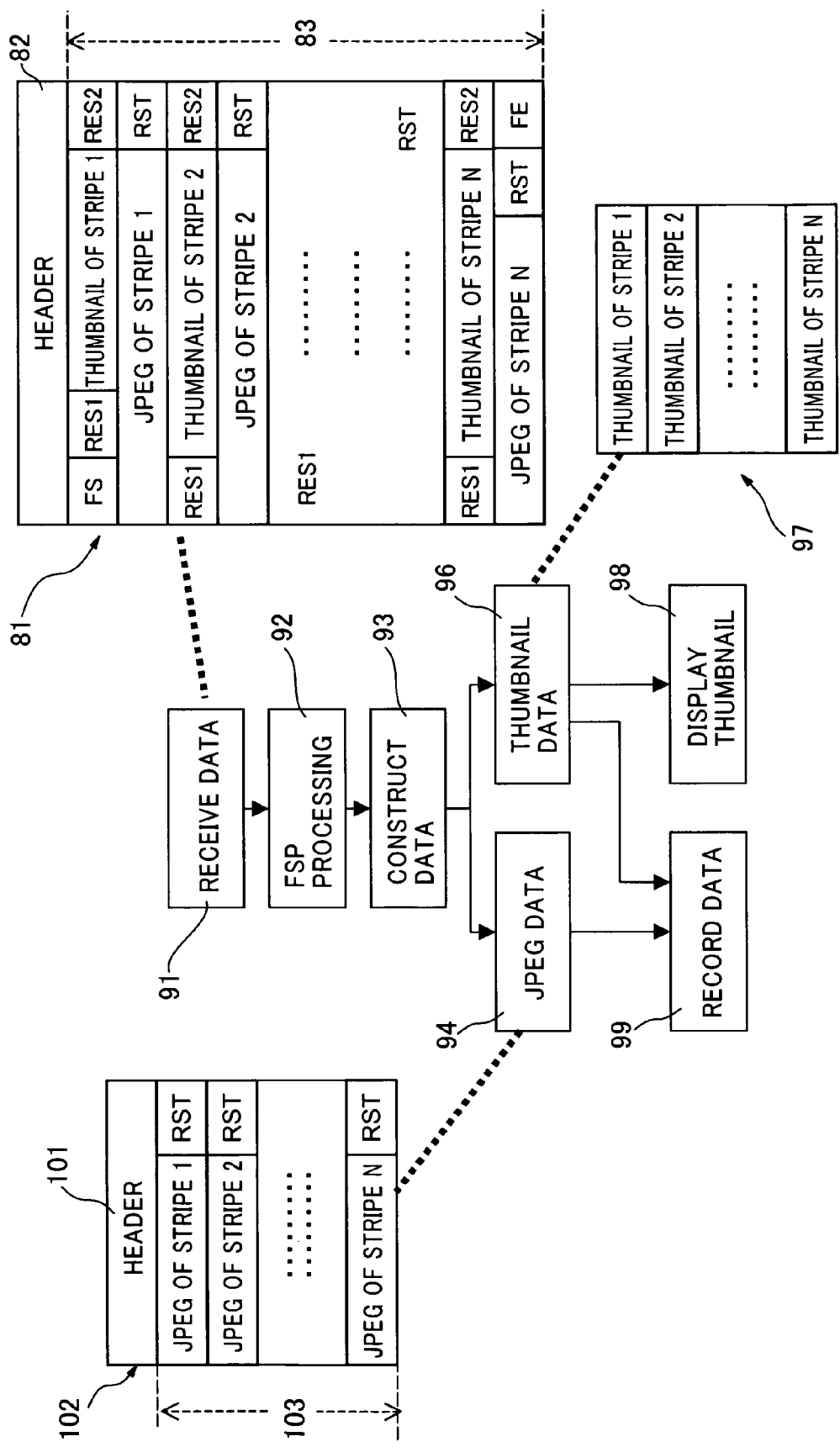
FIG. 6 is a flow chart showing the processing to be carried out by the host module in the electronic device according to the present invention.
Figure 7:
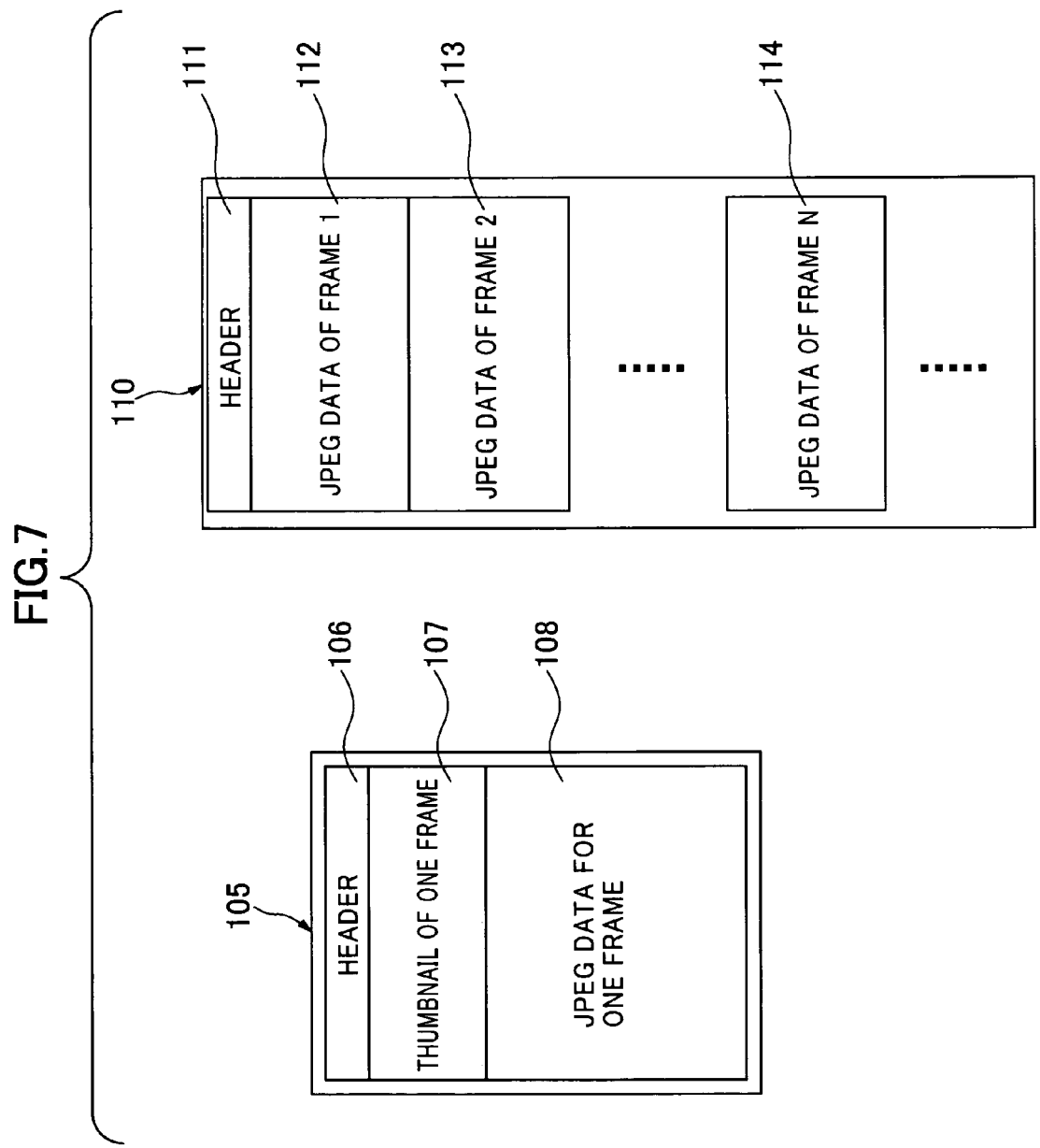
FIG. 7 schematically illustrates the structure of the image data to be saved in a recording medium of the host module in the electronic device according to the present invention.

Next, with reference to FIG. 6 and FIG. 1, the processing carried out in the host module 3 of the present invention will be described below by use of a flow chart. At first, in step 91, the data transmitted from the camera module 2 is received. The received data is temporarily saved in the SPRAM 55 in FIG. 1. This data, as schematically illustrated by a reference numeral 81, may include a header part 82 and a data part 83 having a structure that the data provided by compressing the small portion (stripe) of the image data configuring one frame and the thumbnail data produced from this stripe may appear alternately. The compression data of each stripe included in the data part 83 may construct a portion of the compression image data produced by compressing the image data for one frame and in the same way, the thumbnail data of each stripe may construct a portion of the thumbnail data for one frame. Accordingly, the data part 83 may include the compression image data produced by compressing the image data for one frame and the thumbnail data of this frame. In the case of taking a picture of the moving image, the data having the same structure as that of the data part 83 is continuously transmitted for each frame configuring the moving image from the camera module 2 to be received by the host module 3.

Next, in step 92, the bit pattern protected by the FSP coder 24 of the camera module is unprotected. For example, in the case that 0XA5 is added between 0X00 and 0X00 in step 78, retrieving a bit pattern that 0XA5 follows 0X00 in step 92, the processing that the added 0XA5 is removed from the bit pattern is carried out. This processing is mainly handled by the data construction engine 53.

In step 93, the data construction engine 53 accesses the SDRAM 55 and extracts the compression data of the stripe from among the data 81 temporarily saved. At the save time, in the step 93, the data construction engine 53 accesses SDRAM 55 and extracts the thumbnail data of the stripe from among the data 81 saved temporarily. In this extraction operation, the thumbnail part start code (32 in FIG. 3) and the thumbnail end code 34 or the like become the indicators to distinct the JPEG compression data from the thumbnail data.

In the step 94, it is shown that the compression data of the stripe extracted in the step 93 are collected to have the data structure paternally shown in 101. The data 101 may include a header part 102 and a data part 103 including a plurality of compression data of the stripe, and the data part 103 may include the all of the compression data of the stripe that configures one frame. As shown in the drawings, the data 101 includes the end code (36 of FIG. 3) of the JPEG compression data, however, this JPEG compression data cannot be removed because the initialization position of the Huffman coder is necessarily grasped upon coding by the standard JPEG decoder. However, since the end code is a code that can be decoded by the standard JPEG coder, there is no problem upon decoding of it. In the meantime, upon taking a picture of the moving image, the data structure similarly to that of the data part 103 is produced continuously for each frame configuring the moving image.

In step 96, it is shown that the thumbnail data of the stripe extracted in the step 93 are collected to have the data structure paternally shown in 97. In this case, the thumbnail part start code of the stripe (32 of FIG. 3) and the thumbnail part end code (34 of FIG. 3) are removed. The data 97 may include the thumbnail data of the all stripes configuring the thumbnail of one frame.

In step 98, the thumbnail data 97 of one frame produced in the step 96 is displayed by the display unit (59 in FIG. 1). The processing for display is mainly handled by the CPU 52. Upon taking a picture of the moving image, the data similar to the data 97 is continuously produced for each frame configuring the moving image to be displayed.

In step 99, the compression data and the thumbnail data produced for each frame are saved in the data recording medium (the flash memory 57 in FIG. 1). The constructional example of the data to be recorded in the data recording medium of the still image is shown by the reference numeral 105 in FIG. 7 and that of the moving image is shown by the reference numeral 110 in FIG. 7. In the data construction 105 and the data construction 110 to be recorded in the data recording medium, neither the compression data nor the thumbnail data has the structure that the small portion of the image data of one frame may appear alternately any more, and the compression data and the thumbnail data of the entire frame are collectively saved. The data 105 may include a header 106, the thumbnail data 107 of the frame, and the JPEG compression data 108 of the frame. In addition, the data 110 to be recorded upon taking a picture of the moving image may continuously include a header 111, the JPEG compression data 112 of the first frame, the JPEG compression data 113 . . . of the next frame, and the JPEG compression data 114 . . . of the Nth frame. In the meantime, the data 110 has the construction similar to that of the data acquired by the compression due to the normal Mortion JPEG. The data recording processing in the step 99 is controlled by the data construction engine 53 and the CPU 52.

Figure 8:
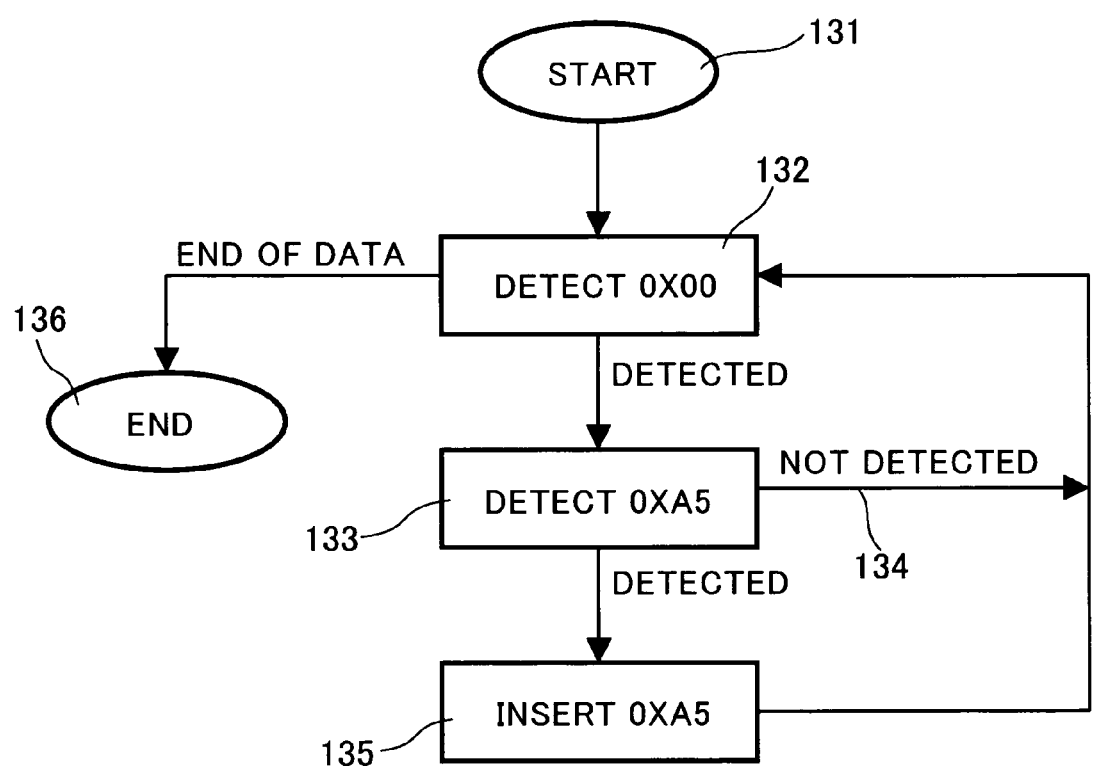
FIG. 8 is a flow chart showing the FSP decoding processing to be carried out by the host module in the electronic device according to the present invention.
Figure 9:
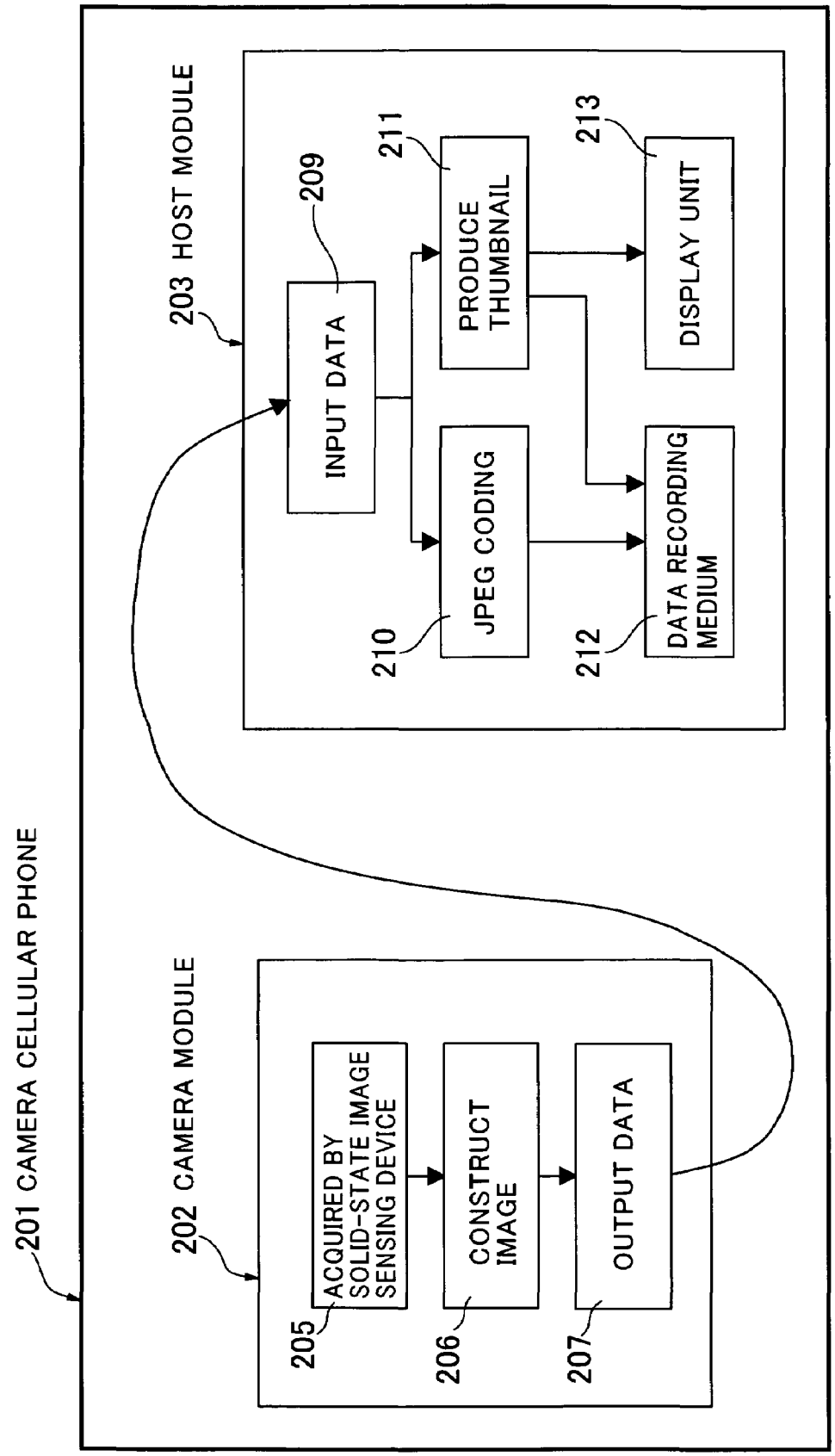
FIG. 9 illustrates a related art of the electronic device according to the present invention.

Next, with reference to FIG. 8, the flow of the FSP decoding processing carried out in the step 92 of FIG. 6 will be described below with reference to the flow chart. The FSP coding processing is designed in accordance with the interface of the data transfer between the camera LSI and the host module, however, the FSP decoding processing is carried out only for the data transfer and the high functionality thereof, so that the decoding processing to remove FSP coding processing is carried out in the host module. Here, in accordance with the explanation about the FSP coding processing, it is assumed that 0XA5 is inserted after 0X00 in the FSP coder 24. At first, in step 131, the FSP decoding processing is started. In step 132, with respect to the data temporarily saved in the SDRAM (55 of FIG. 1), the data construction engine 53 may retrieve the bit pattern of this data by rotation and search the existence of the bit pattern of 0X00. When 0X00 is detected, proceeding to step 133, the data construction engine 53 may check if the next bit pattern is 0XA5 or not. When the next bit pattern is not 0XA5, returning to step 132 to continue the retrieving (step 133), and when it is 0XA5, 0XA5 is deleted from the bit pattern. Thus, the retrieving is continued till the last of the data, and then, the FSP decoding processing is terminated (step 136).

In the meantime, the above-described embodiment is an example to put the invention in practice and it is obvious that various embodiments can be made in the range without deviating from the scope of the invention. For example, in FIG. 3, the thumbnail data 33 appears after the frame start code 31 in advance of the JPEG compression data 35, however, as a matter of course, the JPEG compression data 35 is allowed to appear in first. In addition, in the application engine 50 of FIG. 1, the data construction engine 53 may be realized by a dedicated hard ware, however, it may be realized by the CPU 52. Further, adding a SIMD processor to the CPU 52, the function of the data construction engine 53 may be realized by the SIMD processor, or adding a DSP to the application engine 50, the function of the data construction engine 53 may be realized by the DSP.

According to the present invention, in the electronic deice made of the camera module handling taking a picture of the still image and the moving image and the host module handing saving and display of the photographed image, the camera module compresses the image data and produces the thumbnail image of this image data in the order of the FIFO while remarkably reducing the size of this frame buffer memory, so that the image data can be transmitted to the host module and this makes it possible to reduce the cost and the size of the camera module. Further, in the host module, the decoding processing is not required, the display processing to the LCD and saving of the compression data with a thumbnail are allowed, and the reduction of the processing amount and the improvement of the processing speed can be realized.

What is claimed is:

1. An electronic device, comprising:
a camera module, which transmits the data acquired by photographing; and
a host module, which receives said data;
wherein said camera module alternately transmits a compressed small portion including the data made by compressing the small portion of the image data for one frame and a sub small portion including data having a lower resolution than the resolution of the image data.

2. An electronic device, comprising:
a camera module, which transmits the data acquired by photographing; and
a host module, which is provided with a main storage device and a display unit, receives said data, and saves said data in the main storage device;
wherein said camera module comprises a unit for producing the image data for one frame, and further, said camera module produces a compressed small portion including the data made, by compressing the small portion of said image data and a sub small portion including data having a lower resolution than the resolution of the image data, and a process of sequentially transmitting said compressed small portion and said sub small portion is performed with respect to a plurality of small portions of said image data; and
said host module receives said sub small portion and said compressed small portion, produces thumbnail data with the resolution of said image data for one frame reduced from among the received plural sub small portions, displays said thumbnail data on the display unit, produces the compression image data made by compressing said image data for one frame from among said received plural compressed small portions, and saves said compression image data in the main storage device.

3. The electronic device according to claim 2, wherein said compressed small portion includes a part of the data made by compressing said small portion.

4. The electronic device according to claim 2, wherein said compressed small portion includes the entirety of the data made by compressing said small portion.

5. The electronic device according to claim 2, wherein, in said image processing apparatus, the data length of said compressed small portion is a variable length.

6. The electronic device according to claim 2, wherein said sub small portion and said compressed small portion are produced so that they are separable from each other.

7. The electronic device according to claim 2, having a coding unit, which detects a specific bit pattern from a data row of the data to be transmitted and protects said specific bit pattern.

8. The electronic device according to claim 2, wherein said compression format is any one of a JPEG format and a Motion JPEG format.

9. The electronic device according to claim 8, wherein said sub small portion is produced from a result of the inverse cosine conversion of said small portion.

10. The electronic device according to claim 8, wherein the initialization of the compression processing is performed every time said small portion is compressed.

11. The electronic device according to claim 2, further comprising:
   a decoding unit, which detects a bit pattern protected by a specific bit pattern from among a data row of said received data to unprotect the protection of said specific bit pattern.

12. The electronic device according to claim 2, wherein said unit for producing the image data fetches RAW data produced by A/D converting the data output from a solid-state image sensing device and produces the image data for said one frame from said RAW data.

13. An image processing apparatus, comprising:
   an image data producing unit, which fetches RAW data produced by A/D converting the data output from a solid-state image sensing device and produces the image data for one frame from said RAW data; and
   a data processing unit, which holds a small portion of said image data, produces a compressed small portion including the data made by compressing said small portion and a sub small portion including data having a lower resolution than the resolution of the image data, and sequentially transmits said compressed small portion and said sub small portion with respect to a plurality of small portions of said image data.

14. An electronic device, comprising:
   a camera module, which transmits the data acquired by photographing; and
   a host module, which is provided with a main storage device and a display unit, receives said data, and saves said data in a main storage device;
   wherein, in the case that the data to be transmitted includes a bit pattern corresponding to a head portion of a command code in an interface part to connect said camera module to said host module, said camera module inserts a protection identifier after said bit pattern and said host module deletes said protection identifier continued after said bit pattern.

* * * * *